Jan. 30, 1968       J. C. HAWKINS ET AL       3,366,184
                AGRICULTURAL AND LIKE MACHINES
Filed June 8, 1964                              4 Sheets-Sheet 4
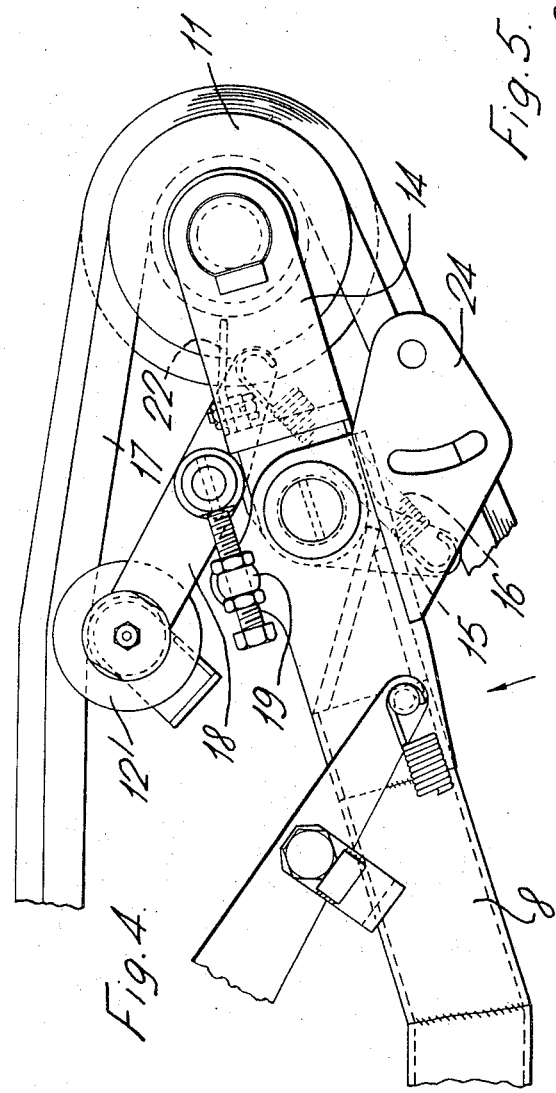
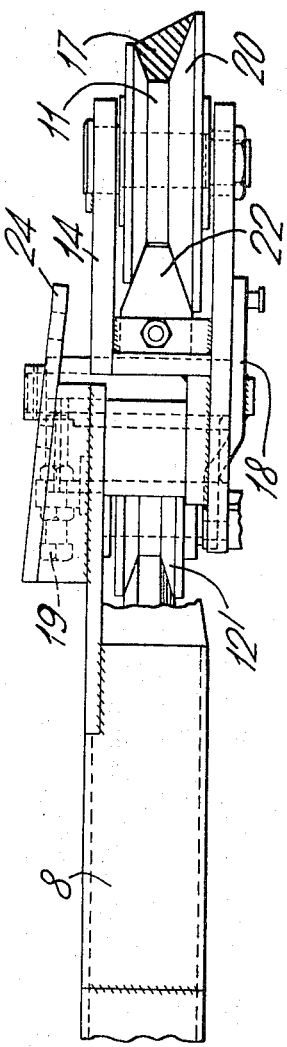

United States Patent Office
3,366,184
Patented Jan. 30, 1968

3,366,184
AGRICULTURAL AND LIKE MACHINES
John Clement Hawkins, Clophill, Bedford, and Philip Whyte, Bedford, England, assignors to National Research Development Corporation, London, England, a corporation of Great Britain
Filed June 8, 1964, Ser. No. 373,234
Claims priority, application Great Britain, June 14, 1963, 23,893/63
6 Claims. (Cl. 171—61)

ABSTRACT OF THE DISCLOSURE

A conveyor harvester implement comprises the combination of a soil disturbing implement having a pair of downwardly converging, interacting disc-like rotors and a belt type conveyor. The conveyor is a double belt conveyor for gripping and removing a root crop to be harvested. The leading end of the conveyor extends down between the two disc-like rotors, and comprises two endless belts extending in the same direction and each passing around a lower leading pulley located between the disc-like rotors and an upper rear pulley. The leading pulleys of the two belts are mounted with their general planes at an angle to each other so as to converge downwardly between the disc-like rotors, the inclination of the pulleys permitting their location well between the disc-like rotors. The belts can be shaped non-symmetrical so as to present parallel faces to each other between the leading pulleys despite the inclinations. The pulleys are resiliently biased toward each other.

---

Figure 1:
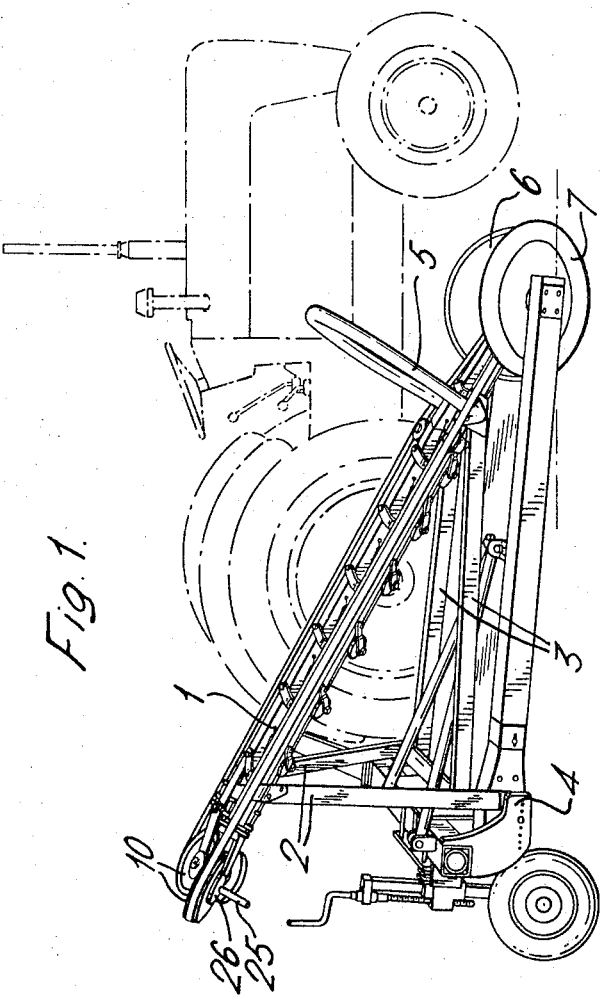

This invention relates to agricultural and the like implements for harvesting and/or lifting root crops such as potatoes, bulbs or similar tubers which grow below ground level, or alternatively true root crops or those crops the main harvestable portions of which grow above ground level.

The invention concerns more particularly an implement, which is adapted to prepare the crop, or the soil adjacent the crop, for harvesting by the interaction of a pair of disc-like rotors, the general planes of the rotors being at an angle to each other so as to converge downwardly. The invention is further particularly concerned with these implements when combined with a well-known belt type of conveyor in which the crop, or some part of it, after being fed to the conveyor, is gripped between two driven, substantially parallel, endless belts which lift the crop to a convenient level and there deposit it. The belts are arranged to pass around pairs of pulleys at each end and the practice has been with such conveyors to arrange the pulleys at each end so that they rotate in common general planes. It is essential for use with an implement for havesting and/or lifting that the throat of the conveyor should be resonably close to ground level in order to receive the crop, or the part of it which it is to grip and it is seen from the geometry of an arrangement using the interacting rotors as proposed, that the bottom pair of pulleys would have to be made very small so as to avoid fouling the rotors; the latter would otherwise prevent the throat of the conveyor from approaching sufficiently near the crop to receive it. There would, however, be at least two disadvantages with such a construction, the first being that it would be almost impossible to operate the conveyor using pulleys of the small size that would be necessary; another disadvantage would be that the outside "return" parts of the belts would operate at the same level as the lifting parts and at the lower pulleys the belts would tend to drag soil and/or trash into the pulleys to cause them to tend to jam.

In a double-belt conveyor in accordance with the invention, the lowermost pair of pulleys of the conveyor is arranged with the general planes of the pulleys at an angle to each other so as to converge downwardly.

It may be arranged that the uppermost pair of pulleys is also angled, though the angle between the planes of the pulleys at the top need not be the same as that between the bottom pulleys. Also, of course, intermediate guide and/or pressure pulleys may be angled to suit the lay of the belt, though this is not essential.

When used with the angled rotor implement as described above, therefore, the inclination of the planes of the lower pulleys enables the throat of the conveyor to approach the motor more closely than hitherto; and by suitable choice of angles an ideal combination may be devised.

The profiles of the pulley grooves of the one or more angled pairs may be shaped, or alternatively the belts themselves may be shaped, so as to provide a convenient disposition of the gripping faces of the belts.

It will be seen that, in a conveyor in accordance with the invention the pulleys may be arranged to be of reasonable diameter and yet approach the crop sufficiently closely to give the required pick-up action; and at the same time the combined effect of large diameter and angle of disposition of the pulleys provides useful clearance between the "return" parts of the belts and the ground.

In order that the invention may be more clearly understood, one embodiment thereof in a side-mounted harvester-conveyor combination will now be described by way of example with reference to the accompanying drawings.

Figure 2:
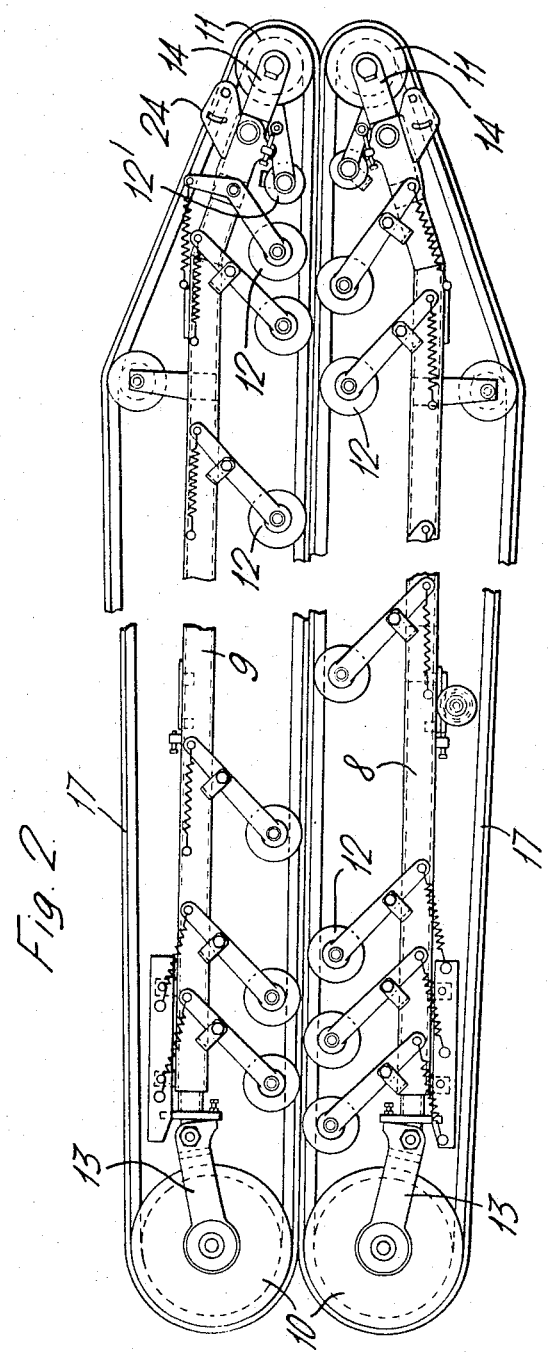
Figure 3:
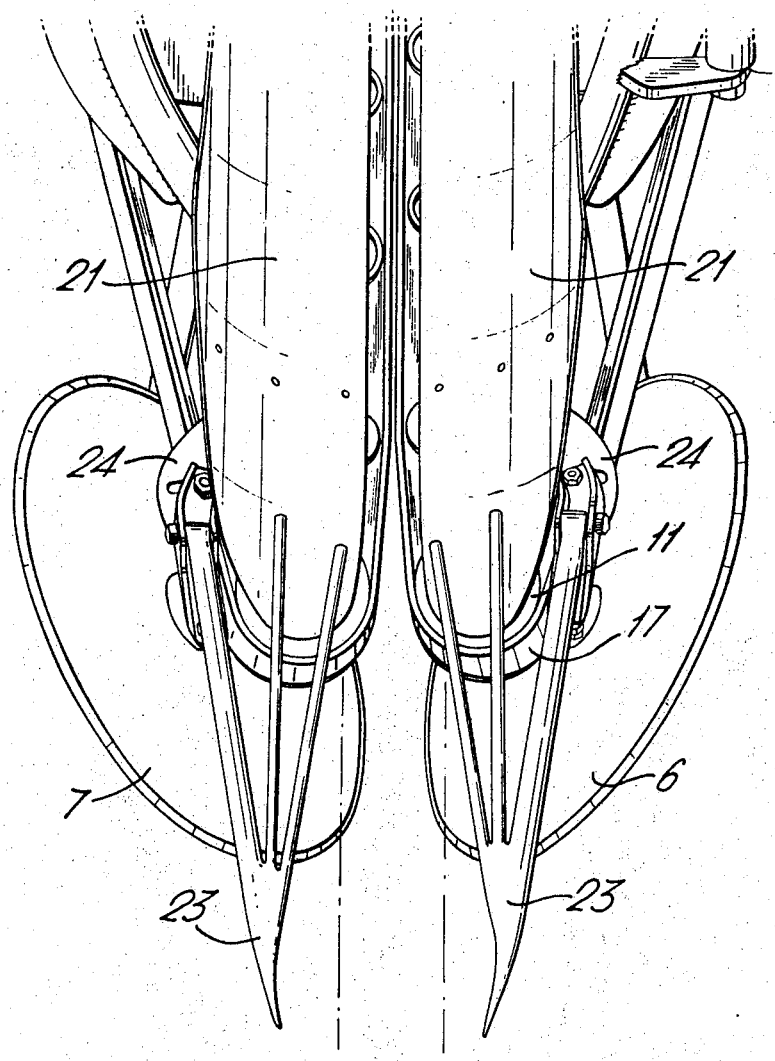

In the drawings, FIGURE 1 represents a general perspective side elevation of the combination and FIGURES 2 and 3 respectively, a plan view of the conveyor mechanism and a detail of the front part of the conveyor. In FIGURE 3 part of the conveyor cover is shown that is removed, for clarity, in the views of FIGURES 1 and 2. FIGURES 4 and 5 show two views at right-angles to each other, of a detail of the conveyor at the lower end of one of the belts.

As shown in the drawings, the conveyor 1 is supported by members 2 and 3 from a double rotary-disc share machine 4 which is carried at the side of a tractor, the latter being shown ghosted in FIGURE 1. A member 5, looped to clear crops being moved on the conveyor, serves as additional support for the conveyor.

The conveyor itself comprises two box girder, or possibly tubular, main members 8, 9 which support pivoted brackets 13 and 14 for the upper rear pulleys 10 and lower leading pulleys 11 respectively, as well as hinged spring-biassed brackets for intermediate pulleys 12. The brackets 14 are, as more clearly shown in FIGURE 4, cranked and the ends of their crank arms 15 are connected by tension springs 16 to the ends of the brackets 18 for the lowermost intermediate pulleys 12'; the pivots for the brackets 18 are mounted on brackets 14. The springs 16, therefore, serve to bias both the brackets 14 and the brackets 18 to maintain pressure on the belts at the throat or leading end of the conveyor, adjustment members 19 being provided to establish the exact form of the throat of the conveyor.

In accordance with the invention, the general planes of the lower leading pulleys 11 are inclined to each other, in this case the angle of each to the ground being about 20°. In this case, too, the whole of the belt systems are inclined, as will be seen particularly from FIGURE 1, and this is conveniently achieved by suitable angling of the main support girders 8 and 9 in their attachment to support members 2 and 3; but, as has been pointed out above, it is not essential that every part of the systems should be angled.

Since the pulleys are angled, the belts themselves are angled and, although presentation of corner portions of the belts to each other might serve to provide greater indentation of the crops being lifted by the belts, and therefore possibly greater grip, it has been found that an alternative form of belt is advantageous. Thus, as shown more clearly in FIGURE 5, a V-belt of normal form may have rubber, or suitable other material, added to conform to the angle of tilt of the pulleys so as to provide substantially parallel surfaces presented to each other. In this way, also, the surface area of the belts 17 offered to the crop, is greater than that offered by the normal belt. It is possible that advantages may accrue from the use of one shaped belt in conjunction with one normal belt but preferably both are so shaped.

In the latter case, at least one flange 20 of each of the lower end pulleys 11 is preferably larger than the other, in order to accommodate and provide support for, the non-symmetrical belts. In addition, those of the upper rear pulleys may be similarly non-symmetrical in radial section.

It will be observed that, with this arrangement of conveyor, and here the angle made by the conveyor to the ground is about 30°, it is possible to achieve closer co-operation between the mouth of the conveyor and a disc-type share. The discs 6 and 7 of the share illustrated are arranged at an angle of between about 60° and, say, 140° to each other, and the lower or leading end of the conveyor fits well down between the discs, so that its throat may closely approach crops to be harvested.

In order to protect the conveyor mechanism in some measure, cover plates 21 are provided and pulley scrapers, such as at 22, may also be provided. Gathering points 23 may be provided at the entrance to the harvester, and these may be adjustably mounted on brackets 24 carried by the main support girders 8 and 9. Adjustment of the gathering points 23 may be effected simply by loosening of the bolts mounting the gathering points 23 on the brackets 24.

The drive to the belts may be effected through shafts 25, which are coupled through slit-clutches 26, or other suitable connections, to the upper end pulleys 10; and power to drive the conveyor may be taken off the tractor in a manner that will be well known to those skilled in the art. The drive to the discs of the share will similarly be taken off the tractor and transmitted to the discs.

It will be noted that the throat of the conveyor will be, similarly to the mouth of the share, within easy view of the driver of the tractor, and this will ease his control of the machine. It will be appreciated, however, that the usefulness of the invention is not confined to side-mounted machines.

We claim:
1. A conveyor harvester implement comprising a mobile frame, a pair of soil-engaging interacting disc-like rotors carried by said frame for preparing the soil adjacent root crops for harvesting the root crop, the general planes of said rotors being at an angle to each other so as to converge downwardly, a double belt conveyor carried by said frame for gripping the root crop to be harvested and lifting it from the ground and conveying it to a point of deposit, the leading end of said conveyor extending down between the two rotors, said double belt conveyor comprising two endless belts extending in the same direction and each passing around a lower leading pulley located between said disc-like rotors and an upper rear pulley, the leading and rear pulleys of each belt being disposed adjacent the leading and rear pulleys of the other belt so that the inner portion of one belt lies closely adjacent the inner portion of the other belt for gripping the root crop therebetween, and means mounting the leading pulleys of the two belts with the axes of the pulleys at an angle to each other so as to diverge downwardly between said disc-like rotors, the inclination of said leading pulleys permitting their location to be well down between said disc-like rotors whereby the leading end of said conveyor can closely approach the root crops to be harvested.

2. An implement as claimed in claim 1 wherein at least one of said belts is shaped non-symmetrically so that its outer surface lies in a substantially vertical plane when passing between said two leading pulleys.

3. An implement as claimed in claim 1 wherein both of said belts are shaped non-symmetrically so that their respective outer surfaces are parallel when passing between said two leading pulleys.

4. An implement as claimed in claim 1 wherein said means mounting said two leading pulleys comprises elongated girder members carried by said frame and extending longitudinally in the direction of said double belt conveyor, each girder member lying between the leading and rear pulleys of one of the respective belts, a bracket pivotally mounted on each respective girder member at the end thereof adjacent the leading pulley for pivotal movement in the plane of the associated leading pulley, and means mounting each leading pulley on its associated bracket, whereby the leading pulleys can be moved toward and away from each other by pivotal movement of said brackets.

5. An implement as claimed in claim 4 further comprising resilient means for biasing said brackets and the pulleys mounted thereon toward each other.

6. An implement as claimed in claim 1 wherein said means mounting the leading pulleys comprises means movably mounting said leading pulleys for movement toward and away from each other, and means for resiliently urging said leading pulleys toward each other.

References Cited

UNITED STATES PATENTS

| | | | |
|---|---|---|---|
| 696,934 | 4/1902 | Bradley | 171—61 X |
| 1,185,785 | 6/1916 | Ferguson | 171—61 |
| 1,715,823 | 6/1929 | Dick | 171—61 X |
| 2,197,225 | 4/1940 | Pierson | 171—62 |
| 2,294,348 | 8/1942 | Kolstad | 171—61 X |

ANTONIO F. GUIDA, *Primary Examiner.*

ABRAHAM G. STONE, *Examiner.*